United States Patent
Ford et al.

(10) Patent No.: US 7,986,690 B2
(45) Date of Patent: Jul. 26, 2011

(54) INTER-GATEWAY CLONED DEVICE DETECTOR USING PROVISIONING REQUEST ANALYSIS

(75) Inventors: Alan Ford, New South Wales (AU); Steve Lee, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 328 days.

(21) Appl. No.: 12/190,527

(22) Filed: Aug. 12, 2008

(65) Prior Publication Data

US 2010/0043041 A1   Feb. 18, 2010

(51) Int. Cl.
*H04L 12/28*   (2006.01)
*H04L 12/56*   (2006.01)

(52) U.S. Cl. ....................................................... 370/389
(58) Field of Classification Search .................. None
See application file for complete search history.

(56) References Cited

U.S. PATENT DOCUMENTS

| | | | |
|---|---|---|---|
| 5,856,974 A | 1/1999 | Gervais et al. |
| 5,862,451 A | 1/1999 | Grau et al. |
| 6,018,767 A | 1/2000 | Fijolek et al. |
| 6,023,464 A | 2/2000 | Woundy |
| 6,657,991 B1 | 12/2003 | Akgun et al. |
| 6,715,075 B1 | 3/2004 | Loukianov |
| 6,802,032 B1 | 10/2004 | Budinger et al. |
| 6,839,829 B1 | 1/2005 | Daruwalla et al. |
| 6,859,826 B2 | 2/2005 | Bahlmann |
| 6,917,591 B2 | 7/2005 | St. John |
| 6,986,157 B1 | 1/2006 | Fijolek et al. |
| 7,058,007 B1 | 6/2006 | Daruwalla et al. |
| 7,272,846 B2 | 9/2007 | Williams et al. |
| 7,293,078 B2 | 11/2007 | Danforth |
| 7,293,282 B2 | 11/2007 | Danforth et al. |
| 7,305,460 B2 | 12/2007 | Park |
| 7,334,252 B1 | 2/2008 | Millet et al. |
| 7,334,258 B1 | 2/2008 | Ford et al. |
| 7,512,969 B2 | 3/2009 | Gould et al. |
| 7,539,193 B2 | 5/2009 | Pfeffer et al. |
| 7,600,003 B1 | 10/2009 | Okimianski et al. |
| 7,606,870 B2 | 10/2009 | Higgs |
| 7,716,468 B2 * | 5/2010 | Millet et al. .................. 713/153 |
| 2002/0066110 A1 | 5/2002 | Cloonan et al. |
| 2005/0005154 A1 | 1/2005 | Danforth et al. |
| 2006/0140164 A1 | 6/2006 | Patel et al. |
| 2006/0159100 A1 | 7/2006 | Droms et al. |
| 2006/0195611 A1 | 8/2006 | Howe |
| 2007/0208932 A1 | 9/2007 | Millet et al. |

(Continued)

OTHER PUBLICATIONS

Cablelabs, Data-Over-Cable Service Interface Specifications DOCSIS 3.0 Security Specification, c. 2006-2007, Cable Television Laboratories, Inc., http://cablemodem.com/specifications/specifications30.html.

(Continued)

*Primary Examiner* — Ayaz R Sheikh
*Assistant Examiner* — Blanche Wong
(74) *Attorney, Agent, or Firm* — Stolowitz Ford Cowger LLP

(57) ABSTRACT

In one embodiment, a cloned cable modem detector is configured to assemble a table associating cable modem physical addresses to Cable Modem Termination Systems (CMTSs) according to provisioning requests forwarded from the CMTSs. When one of the provisioning requests associates a cable modem physical address with a different CMTS than an existing association in the table, the detector outputs an indication of cable modem cloning.

21 Claims, 4 Drawing Sheets

U.S. PATENT DOCUMENTS

| | | |
|---|---|---|
| 2008/0109864 A1 | 5/2008 | Danforth et al. |
| 2008/0126540 A1 | 5/2008 | Zeng et al. |
| 2008/0177998 A1 | 7/2008 | Apsangi et al. |
| 2008/0225749 A1* | 9/2008 | Peng et al. .................. 370/254 |
| 2009/0070800 A1 | 3/2009 | Gould et al. |
| 2009/0083406 A1 | 3/2009 | Harrington et al. |
| 2009/0193129 A1 | 7/2009 | Agarwal et al. |
| 2009/0198804 A1 | 8/2009 | Danforth et al. |
| 2009/0213871 A1 | 8/2009 | Carlson et al. |
| 2009/0282134 A1 | 11/2009 | Walston et al. |
| 2010/0040055 A1* | 2/2010 | Ford et al. .................. 370/389 |

OTHER PUBLICATIONS

Stolowitz Ford Cowger LLP, Listing of Related Cases, Nov. 2, 2010.

* cited by examiner

41 — Cable clone-detect enable

42 — Cable clone-detect max-mac-addresses <num>

43 — Cable clone-detect CMTS <index> name

44 — Cable clone-detect cmts <index> giaddr <addr>

45 — Cable clone-detect relay-info-modem-check

46 — Cable clone-detect allow-unconfigured-giaddr

51 — Show cable clone-detect summary

52 — Show cable clone-detect mac-address [<cr>} | <mac-addr> | cmts <index> | giaddr <ipaddr>]

53 — Show cable clone-detect clones [<cr> | cmts <index> | giaddr <ipaddr>]

54 — Show cable clone-detect cmts [<cr> | <index>]

55 — Show cable clone-detect giaddr [<cr> | <ipaddr>]

FIG. 4

INTER-GATEWAY CLONED DEVICE DETECTOR USING PROVISIONING REQUEST ANALYSIS

TECHNICAL FIELD

The present disclosure relates generally to the field of cable networks.

BACKGROUND

Cable operators have widely deployed high-speed data services on cable television systems. These data services allow subscriber-side devices, such as personal computers, to communicate over an ordinary cable TV network Hybrid Fiber Coax (HFC) cable through a cable modem. The cable modem communicates with a Cable Modem Termination System (CMTS), which connects the cable TV network to a data network, such as the Internet.

The cable operators have recently been plagued by service theft through cable modem cloning. Cable modem cloning works by having one party sign up for a cable modem Internet Service legitimately, and then having another party "clone" or copy that cable modem and it's identifying data. This theft can be difficult to detect, particularly when the cloned modem connects to a different CMTS than the original modem. The disclosure that follows solves this and other problems.

BRIEF DESCRIPTION OF THE DRAWINGS

FIG. 4 illustrates pseudo code that can be used to control the clone detector shown in FIGS. 1 and 2.

DESCRIPTION OF EXAMPLE EMBODIMENTS

Overview

In one embodiment, a cloned cable modem detector is configured to assemble a table associating cable modem physical addresses to Cable Modem Termination Systems (CMTSs) according to provisioning requests forwarded from the CMTSs. When one of the provisioning requests associates a cable modem physical address with a different CMTS than an existing association in the table, the detector outputs an indication of cable modem cloning.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

Figure 1:
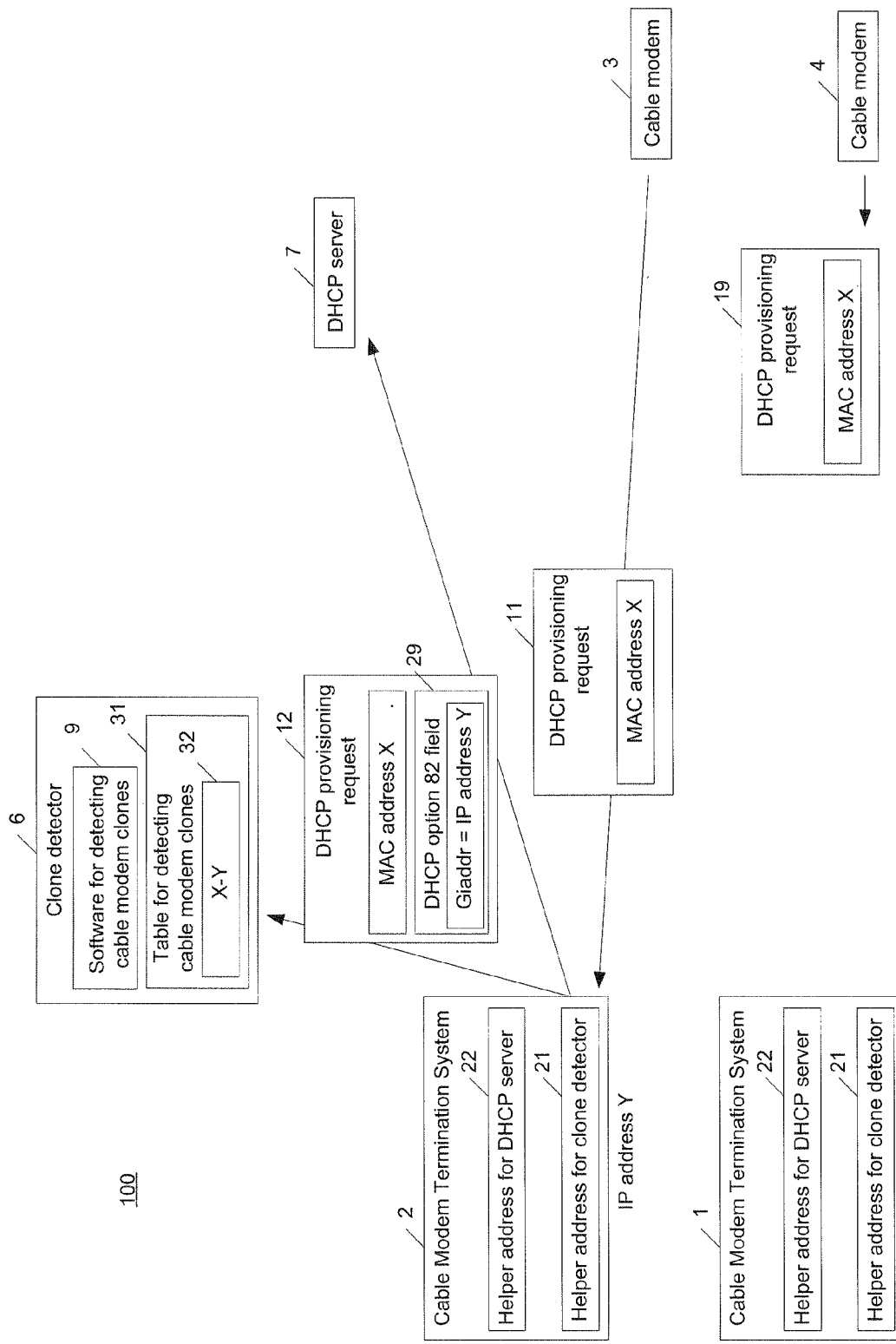
FIG. 1 illustrates an example system for cloned cable modem detection.

FIG. 1 illustrates an example system for cloned cable modem detection.

The system 100 includes a cloned modem detector 6 that inspects relayed provisioning requests to detect cloned cable modems. The detector 6 uses the relayed provisioning requests to build a table associating physical addresses of cable modems with information corresponding to a respective CMTS. When a physical address that is already paired with one CMTS in the table 6 is associated with a different CMTS in a received provisioning request, the detector 6 has identified a potential cable modem clone, and can alert an operator. Accordingly, the detector 6 can detect the existence of a clone even if the original cable modem and its clone are downstream from different Cable Modem Termination Systems (CMTSs). The principles described above are best illustrated through the example included in the following paragraphs.

By way of background on cable networks, it should be understood that an initial step in bringing a cable modem online is for the cable modem to request provisioning information from a Dynamic Host Configuration Protocol (DHCP) server or other provisioning server. The provisioning information contains an address for the cable modem and other information needed by the cable modem to complete ranging. In a typical cable network, the CMTS operates as a relay agent for provisioning requests from the cable modem. Namely, during CMTS configuration, a "helper-address" is configured on the CMTS to indicate a location for relaying received provisioning requests.

For example, in the system 100 an initializing cable modem 3 broadcasts a DHCP provisioning request 11. The request 11 contains the Media Access Control (MAC) address X for the cable modem 3. The CMTS 2, configured as a relay agent, receives the broadcast request 11 and then relays a corresponding request 12 to the DHCP server 7, which is a target indicated by the configuration 22 on the CMTS 2. As part of its relay agent function, the CMTS 2 can append the DHCP option 82 field 29 onto the request 12. The field 29 contains a gateway IP address (giaddr), which is the IP address Y belonging to the CMTS 2.

In the system 100, the CMTSs 1 and 2 are configured with an additional configuration 21, which identifies the clone detector 6 as an additional target for relayed provisioning requests from the CMTS 2. Accordingly, the request 12 is also sent to the clone detector 6.

The clone detector 6 receives the request 12, which will be used to build the table 31 on the detector 6. As will be explained later in greater detail with reference to FIG. 2, the detector 6 may use filtering to prevent table entries from being added for provisioning requests originating from devices besides cable modems, and to otherwise preserve resources on the detector 6. In any case, referring still to FIG. 1, since the request 12 originated from the cable modem 3, the software 9 compares the request 12 to the table 31, and since no other conflicting entries exist, causes the entry 32 to be added into the table 31. The entry 32 identifies the MAC address X for the cable modem 3, as well as identifying information for the CMTS 2, which in the present example is the IP address Y from the giaddr subfield of the field 29.

As the CMTSs 1 and 2 continue to receive provisioning requests, and forwarding these requests to the detector 6, the detector 6 will continue to add entries to the table 31. Eventually, if another cable modem 4 having the same MAC address X sends a provisioning request 19, the detector 6 will identify the clone. Namely, when the detector 6 receives a forwarded provisioning request corresponding to request 19, such a forwarded request will contain the MAC address X and the IP address Z for the CMTS 1. When the detector 6 compares this information to the table 31, the detector 6 will observe that the entry 32 already correlates the MAC address X with a different CMTS 2. Since a single cable modem connects to one CMTS at a time, this indicates a cable modem clone. The detector 9 can output an indication of cloning responsive to this event in any manner, such as creating a log entry for review by an operator, sending a Simple Network Management Protocol (SNMP) or other message to the CMTS 1 to trigger the CMTS 1 to reset the cable modem 4, sending the Simple Network Management Protocol (SNMP) or other message to the both the CMTSs 1 and 2 to reset both of the cable modems 3 and 4, etc. It should be understood that the cloning can be detected using a comparison prior to the newest entry being added, or by subsequent comparison after the newest entry has been added.

In some cases, a conflict as described above does not necessarily indicate a clone. For example, a single CMTS can have multiple possible relay IP address. Also, in some networks cable modems can validly move within a subset of CMTSs. Accordingly, the detector 6 can also be configured with a list of equivalent CMTS IP addresses. In such a case, after the detector 6 identifies a preliminary conflict, the detector 6 checks to determine whether the two CMTS addresses are listed as equivalents. If so, the detector 6 does not report a cable modem clone.

The detector 6 described above detects a clone on a different CMTS than the original. It can be preferable to detect a clone on the same CMTS as its original using the principles described in U.S. patent application Ser. No. 11/373,807, which is herein incorporated by reference in its entirety. Alternatively, the system 100 can be modified such that the table 32 entries associate the cable modem MAC address with both the CMTS IP address and an associated interface identifier on the CMTS. A CMTS can have a plurality of upstream and downstream channel interfaces, for example up to sixty interfaces or more, each having a channel interface identifier. In such an example, a clone is detected if a new provisioning request includes a MAC address already existing in the table 32, but associated with a different downstream channel, or a different upstream channel, on the same CMTS.

The system 100 described above is operable with a wide variety of cable modems and CMTSs. For example, the system 100 described above is operable with both Data Over Cable Service Interface Specification (DOCSIS) 1.0 modems, as well as DOCSIS 1.1 and greater versions, because the system 100 operates independently of whether the cable modem is configured with Baseline Privacy Interface Plus (BPI+). This is an advantage over detection schemes reliant on BPI+, which can possibly be circumvented by cloning older cable modems.

It should be understood that the detector 6 can be a standalone device, remote from the CMTSs, as described with reference to FIG. 1. Also, the functionality of the detector 6 can be integrated into a master one of the CMTSs, which would aggregate provisioning requests from all the other CMTSs in a cable network.

It should also be understood that the detector 6 can be integrated into the DHCP server 7. An advantage of integrating the detector 6 on that DHCP server 7 is that the configuration 21 may not be needed.

It should be understood that the system described above is transparent to end users operating behind the cable modem 3 and 4. Moreover, basing the cloning check on the field 29, which was added subsequent to transmission from the end user side, adds reliability to the detection scheme. For example, the end user is unable to include false values in this field 29, because this field 29 did not exist when the request 11 was originated, or even while the request 11 was being processed by customer premise equipment.

Figure 2:
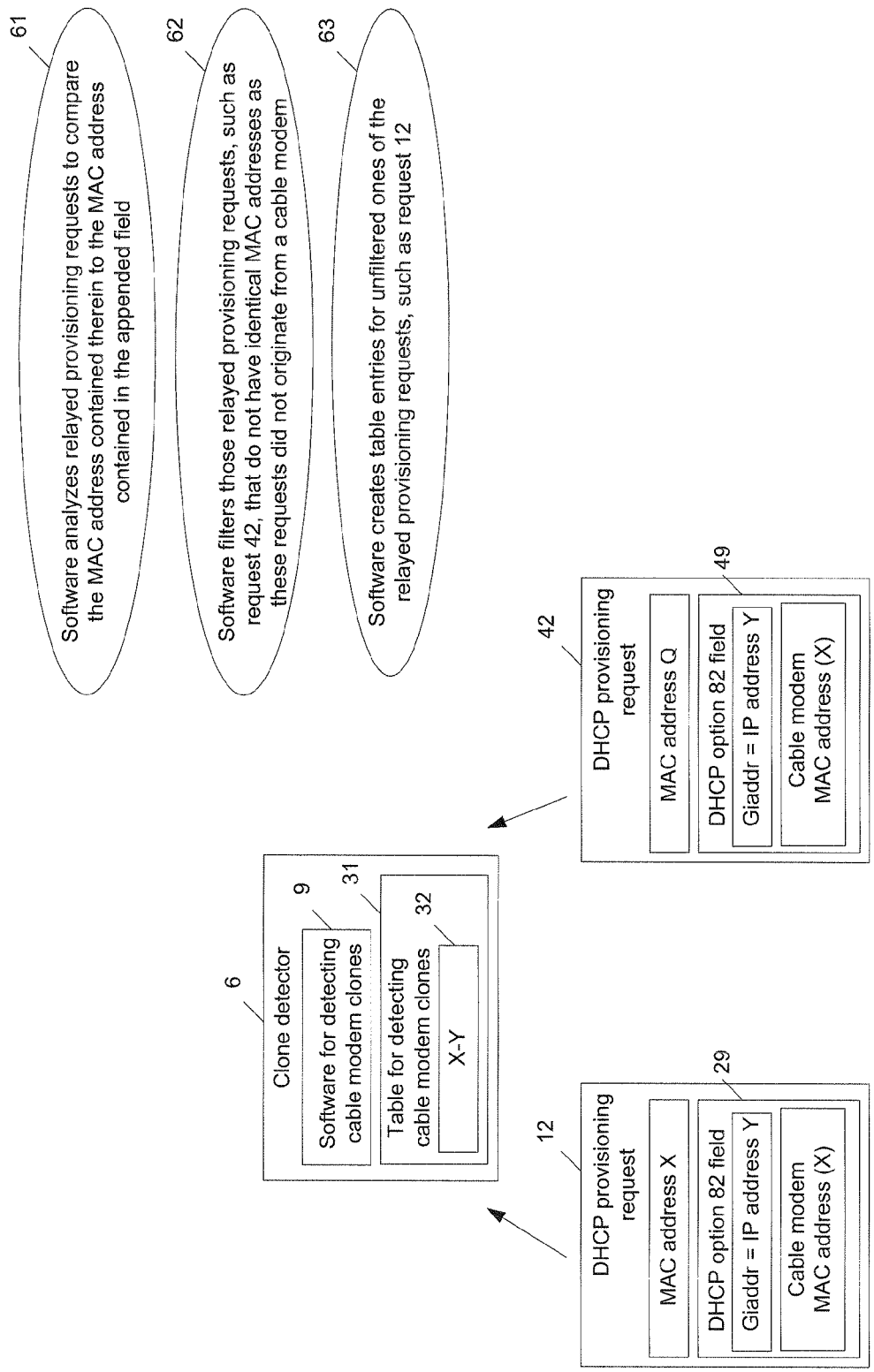
FIG. 2 illustrates filtering that can be used by the clone detector shown in FIG. 1 to converse hardware resources.

FIG. 2 illustrates filtering that can be used by the clone detector shown in FIG. 1 to converse hardware resources.

The configuration 22 on the CMTSs for causing the provisioning requests to be sent to the clone detector 6 can cause provisioning requests originating from other devices besides cable modems to be sent to the detector 6. Depending on the size of the cable network and the amount of resources on the detector 6, comparing every provisioning request to the table 31, or adding an entry for every provisioning request, can over consume detector resources. For example, comparing entries for both cable modems and other devices can over consume processing resources, or building a table for the entries can over consume memory or storage resources. Accordingly, depending on the amount of hardware resources on the detector 6 and the size of the network, and other factors, it can be preferable for the detector 6 to filter those provisioning requests corresponding to devices other than cable modems. Although various types of filtering can be used, the example below illustrates one particular example of filtering that is highly efficient for the detector 6.

The received DHCP request 12 contains the MAC address X for the originating device, cable modem 3, as previously discussed. Specifically, this MAC address X is contained within the body of the request 12, namely in the portion included in original transmission from the cable modem. More specifically, the MAC address X is contained in a client hardware address ("chaddr") field of the broadcast DHCP discovery 11. In the portion of the request 12 that was added by the CMTS 2 as part of a relay function, namely the DHCP option 82 field 29, the CMTS 2 specifies its IP address Y as previously discussed, but also specifies the physical address of a cable modem transmitting the request 11.

According to the above, whenever a request is relayed for a DHCP discover that was broadcast by a cable modem, the relayed request will contain the same MAC address in both the "chaddr" field and the appended field 29. For example, the MAC address X is contained in both portions of the request 12.

In contrast, when a DHCP discover originates from a device other than a cable modem device, the cable modem MAC address inserted by the CMTS is different than the MAC address of the originating device. For example, as illustrated, the DHCP request 42 originating from a host behind the cable modem 3 and having MAC address Q contains the host MAC address Q in the chaddr field and the cable modem MAC address X in the appended field 49.

Therefore, to perform the filtering, the software 9 analyzes related provisioning requests to compare the MAC address contained therein to the MAC address contained in the appended field, as shown in oval 61. The software 9 filters those relayed provisioning requests, such as request 42 that do not have identical MAC addresses, as shown in oval 62. As shown in oval 63, the software 9 creates table entries for unfiltered ones of the relayed provisioning requests, such as request 12.

It should be apparent that filtering by the detector 6 is optional. Moreover, the filtering described above is only one example of filtering that can be used by the detector.

Figure 3:
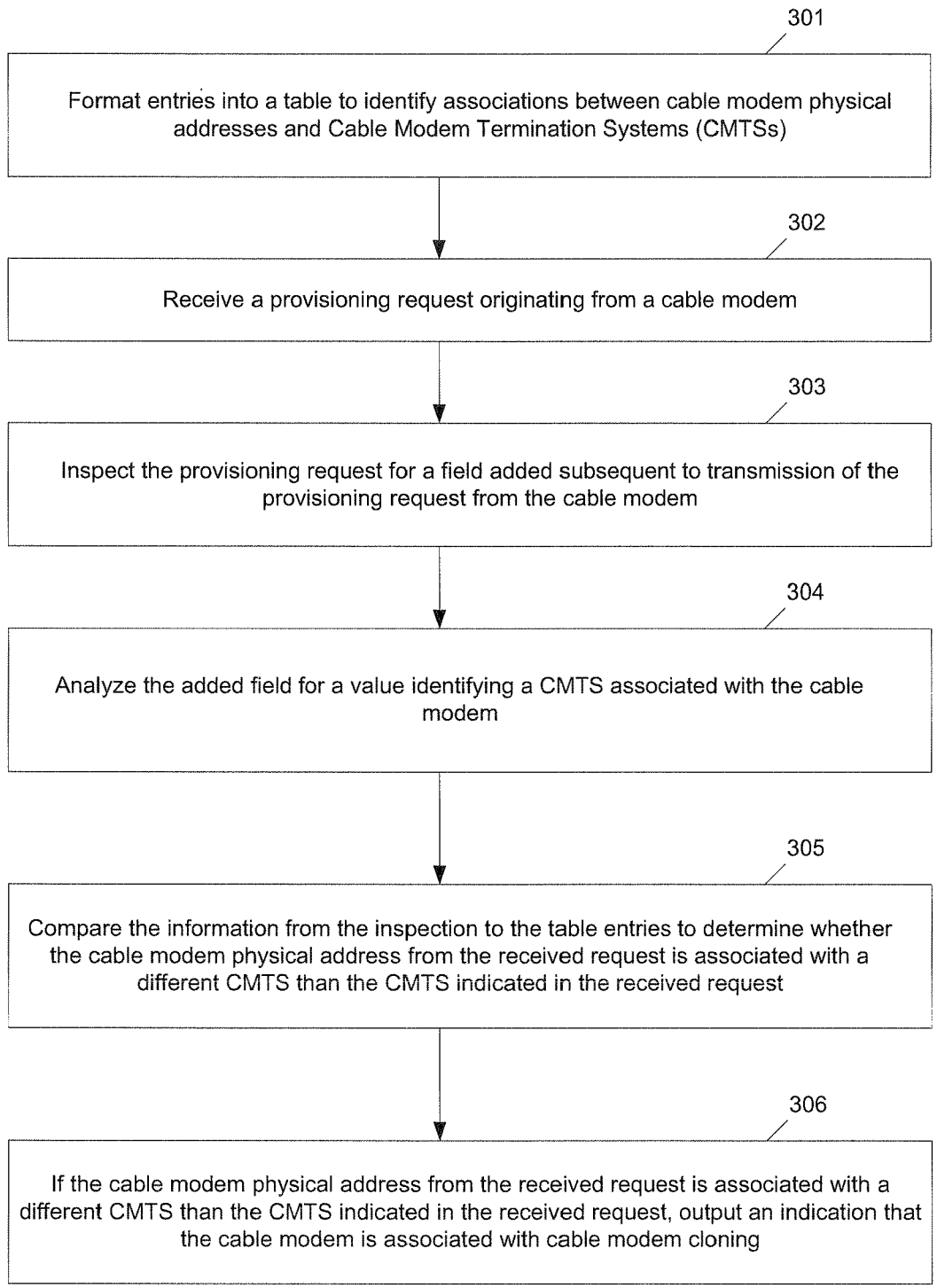
FIG. 3 illustrates an example method for using the clone detector illustrated in FIGS. 1 and 2.

FIG. 3 illustrates an example method for using the clone detector illustrated in FIGS. 1 and 2.

In block 301, the detector 6 formats entries into a table to identify associations between cable modem physical addresses and Cable Modem Termination Systems (CMTSs). Typically such formatting is performed as provisioning requests are received such that the detector 6 builds the table while detecting cloned cable modems.

In block 302, the detector 6 receives a provisioning request originating from a cable modem. In block 303, the detector 6 inspects the received provisioning request for a field added subsequent to transmission of the provisioning request from the cable modem. The detector 6 analyzes the added field for a value identifying a CMTS associated with the cable modem in block 304. The value can be a network address of the CMTS or some other identifier.

In block 305, the detector 6 compares the information from the inspection to the table entries to determine whether the cable modem physical address from the received request is already associated with a different CMTS than the CMTS indicated in the received request. If the cable modem physical address from the received request is associated with a different CMTS than the CMTS indicated in the received request, in block 306 the detector 6 outputs an indication that the cable modem is associated with cable modem cloning.

It should be understood that a new entry is created in the table if the received provisioning request includes a cable modem physical address not already included in the table. In this way, the table is continually assembled as the detector 6 sniffs for cable modem cloning.

FIG. 4 illustrates example pseudo code that can be used to control the clone detector shown in FIGS. 1 and 2.

The box 41 includes an example of a Command Line Interface (CLI) instruction that can be input to the detector 6 to cause the software 9 to enable clone detection. The box 42 includes a command to limit the number of entries to be stored (one MAC address per entry), which in turn controls a maximum amount of system memory that can be consumed by the clone detection table.

The box 43 includes a command to specify a list including equivalent CMTS IP addresses that can be associated with a same cable modem MAC address without triggering notification of cable modem cloning. The box 44 includes a command for specifying a giaddr associated with a CMTS. The command in box 44 can be used for additional filtering, as will be explained in the next paragraph, or for identifying a plurality of IP addresses associated with a same CMTS for the equivalency list.

The box 45 includes a command to filter provisioning requests that are from devices other than cable modems. The box 46 includes a command to perform further filtering based on giaddrs not explicitly configured via the command in box 44. Other commands are shown in boxes 51-55.

Several examples have been described above with reference to the accompanying drawings. Various other examples of the invention are also possible and practical. The system may be exemplified in many different forms and should not be construed as being limited to the examples set forth above.

For example, the principles described above are not limited to cable modems and can be applied to any router or other provisioning relay agent. As one alternative example, a router associated with an Internet Protocol (IP) phone can relay a provisioning request (a DHCP provisioning request or otherwise) to a detector. Thereafter, the detector can monitor for cloned IP phones appearing on different routers.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations.

Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
a processing device configured to:
receive, over a network, provisioning requests originating from cable modems;
assemble a table having entries that associate cable modem physical addresses with identifiers for Cable Modem Termination Systems (CMTSs) according to relay fields attached to the received provisioning requests;
compare information from a particular one of the received provisioning requests to the table entries, wherein the information includes at least a cable modem physical address value; and
detect and indicate cable modem cloning if the comparison indicates that a physical address for one of the cable modems is associated with more that one CMTS.

2. The apparatus of claim 1, wherein the particular provisioning request is a current provisioning request and the processing device is further configured to:
receive a plurality of previous provisioning requests, the previous provisioning requests received before the current provisioning request, the previous provisioning requests having relay fields added thereto;
map Media Access Control (MAC) addresses of the cable modems to the CMTSs according to address information stored in the relay fields as the previous provisioning requests are received;
generate a table according to the mappings; and
compare a physical address extracted from the current provisioning request to entries of the generated table to determine whether the extracted physical address is associated with another CMTS besides a CMTS identified by the current provisioning request;
wherein if the comparison indicates that the extracted physical address is absent from the generated table, the processing device adds a new mapping to the generated table and does not output the indication; and
wherein if the comparison indicates that the extracted physical address is present in the generated table, the processing device outputs the indication according to the determination.

3. The apparatus of claim 1, wherein the processing device is further configured to:
compare a MAC address extracted from an added field of the particular provisioning request to a MAC address included in an original portion of the particular provisioning request; and
filter the particular provisioning request if the MAC addresses are not the same.

4. The apparatus of claim 3, wherein the processing device is further configured to add an entry for the particular provisioning request to the table according to whether the MAC addresses are the same.

5. The apparatus of claim 1, wherein the processing device is further configured to:
   identify a communication interface on one of the CMTSs according to information included in the particular provisioning request; and
   output the indication if a table associating cable modem physical addresses with CMTS communication interfaces indicates that the cable modem physical address value is associated with another communication interface on the same CMTS.

6. The apparatus of claim 1, wherein the processing device is further configured to cause a particular cable modem to be reset if the comparison indicates that the cable modem physical address value is associated with more than one CMTS.

7. The apparatus of claim 1, wherein each identifier is a network address and the processing device is further configured to:
   determine whether the particular network address is included in a stored list; and
   output the indication only if the particular network address is not included in the stored list.

8. The apparatus of claim 1, wherein each of the identifiers includes at least an Internet Protocol (IP) address of a respective one of the CMTSs.

9. An apparatus, comprising:
   means for receiving, over a network, provisioning requests originating from cable modems;
   means for assembling a table having entries that associate cable modem physical addresses with identifiers for Cable Modem Termination Systems (CMTSs) according to relay fields attached to the received provisioning requests;
   means for comparing information from a particular one of the received provisioning requests to the table entries, wherein the information includes at least a cable modem physical address value; and
   means for detecting and indicating cable modem cloning if the comparison indicates that a physical address for one of the cable modems is associated with more than one CMTS.

10. The apparatus of claim 9, wherein each of the identifiers includes at least an Internet Protocol (IP) address of a respective one of the CMTSs.

11. The apparatus of claim 10, further comprising:
   means for formatting the table to associate the cable modem physical addresses with CMTS communication interface identifiers; and
   means for detecting and indicating cable modem cloning if the comparison indicates that the cable modem physical address value is associated with a plurality of upstream or downstream communication interfaces on a same one of the CMTSs.

12. The apparatus of claim 10, wherein the relay field of the particular provisioning request is a Dynamic Host Configuration Protocol (DHCP) option field added by a DHCP relay agent.

13. The apparatus of claim 10, further comprising:
   means for determining whether the CMTSs associated with the cable modem are all included in a subset of CMTSs specified by a stored list;
   wherein cable modem cloning is indicated only if the CMTSs associated with the cable modem are not all included in the subset.

14. A method, comprising:
   receiving, over a network, provisioning requests originating from cable modems;
   assembling a table having entries that associate cable modem physical addresses with identifiers for Cable Modem Termination Systems (CMTSs) according to relay fields attached to the received provisioning requests;
   comparing information from a particular one of the received provisioning requests to the table entries, wherein the information includes at least a cable modem physical address value; and
   detecting and indicating cable modem cloning if the comparison indicates that a physical address for one of the cable modems is associated with more than one CMTS.

15. The method of claim 14, wherein the relay fields are added to the provisioning requests subsequent to original transmission of the provisioning requests, the relay fields added by the CMTSs.

16. The method of claim 15, wherein each relay field includes an Internet Protocol (IP) address for a respective one of the CMTSs.

17. The method of claim 16, further comprising:
   comparing the IP address from the relay field of the particular provisioning request to an IP address in a particular entry from the table, the particular table entry containing a cable modem physical address with a value that is identical to a value of an originating physical address contained in the particular provisioning request; and
   indicating cloning if the IP addresses are not the same.

18. The method of claim 17, further comprising:
   determining whether the IP addresses are included in a list; and
   indicating cloning if the IP addresses are absent from the list.

19. The method of claim 18, wherein the particular provisioning request is a broadcast DHCP discover relayed to a network device used for the comparison and indication.

20. The method of claim 19, further comprising configuring the CMTSs to forward received DHCP discover messages to a particular network address.

21. The method of claim 14, wherein each of the identifiers includes at least an IP address of a respective one of the CMTSs.

* * * * *